United States Patent
Arai

(10) Patent No.: US 11,239,475 B2
(45) Date of Patent: Feb. 1, 2022

(54) CATALYST LAYER FOR FUEL CELL AND PRODUCTION METHOD THEREFOR

(71) Applicant: TOYOTA JIDOSHA KABUSHIKI KAISHA, Toyota (JP)

(72) Inventor: Tatsuya Arai, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 89 days.

(21) Appl. No.: 16/401,384

(22) Filed: May 2, 2019

(65) Prior Publication Data
US 2019/0348684 A1 Nov. 14, 2019

(30) Foreign Application Priority Data
May 11, 2018 (JP) .............................. JP2018-092281

(51) Int. Cl.
*H01M 4/92* (2006.01)
*H01M 10/61* (2014.01)
(Continued)

(52) U.S. Cl.
CPC .............. *H01M 4/926* (2013.01); *H01M 4/88* (2013.01); *H01M 4/8892* (2013.01);
(Continued)

(58) Field of Classification Search
CPC ........ H01M 4/926; H01M 4/88; H01M 10/61; H01M 4/8892; H01M 4/921; H01M 4/96;
(Continued)

(56) References Cited

U.S. PATENT DOCUMENTS

| 2002/0080558 A1* | 6/2002 | Nonaka | ................... H01G 11/24 361/502 |
| 2003/0124414 A1* | 7/2003 | Hertel | ................. H01M 8/0239 502/180 |

(Continued)

FOREIGN PATENT DOCUMENTS

| CN | 105229834 A | 1/2016 |
| CN | 106457214 A | 2/2017 |

(Continued)

OTHER PUBLICATIONS

Park, Young-Chui, et al. "Effects of carbon supports on Pt distribution, ionomer coverage and cathode performance for polymer electrolyte fuel cells." Journal of Power Sources 315 (2016): 179-191. (Year: 2016).*

(Continued)

*Primary Examiner* — Jeremiah R Smith
(74) *Attorney, Agent, or Firm* — Finnegan, Henderson, Farabow, Garrett & Dunner, LLP

(57) ABSTRACT

Disclosed are a catalyst layer for a fuel cell, including a carbon carrier having pores, a catalyst metal carried on the carbon carrier, and an ionomer covering the carbon carrier, wherein the crystal length of the carbon carrier is not less than 6 nm, and the coverage of the catalyst metal by the ionomer is 55% to 65%, and a method for the production of a catalyst layer for a fuel cell, including heat-treating a carbon carrier having pores, heat-treating the heat-treated carbon carrier under an oxygen atmosphere to activate the carbon carrier, allowing the activated carbon carrier to carry a catalyst metal, mixing the carbon carrier carrying the catalyst metal and an ionomer to cover the carbon carrier with the ionomer, and forming the catalyst layer for a fuel cell using the carbon carrier covered with the ionomer.

6 Claims, 3 Drawing Sheets

(51) Int. Cl.
- *H01M 4/88* (2006.01)
- *H01M 4/96* (2006.01)
- *H01M 8/102* (2016.01)
- *H01M 4/86* (2006.01)
- *H01M 8/1018* (2016.01)

(52) U.S. Cl.
CPC ............. *H01M 4/921* (2013.01); *H01M 4/96* (2013.01); *H01M 8/102* (2013.01); *H01M 10/61* (2015.04); *H01M 4/8605* (2013.01); *H01M 4/8803* (2013.01); *H01M 8/1018* (2013.01)

(58) Field of Classification Search
CPC .. H01M 8/102; H01M 4/8605; H01M 8/1018; H01M 2300/0082; H01M 4/8673; H01M 8/1004; H01M 4/625; H01M 8/10; H01M 4/8817; H01M 4/8803; Y02E 60/10; Y02E 60/50; Y02P 70/50
See application file for complete search history.

(56) References Cited

U.S. PATENT DOCUMENTS

| | | | |
|---|---|---|---|
| 2006/0002844 A1* | 1/2006 | Suenaga | H01M 4/926 423/447.3 |
| 2011/0200916 A1* | 8/2011 | Morinaga | H01M 4/8892 429/532 |
| 2012/0094215 A1* | 4/2012 | Satou | H01M 8/1004 429/516 |
| 2013/0101906 A1* | 4/2013 | Alvarez Gallego | H01M 4/8807 429/401 |
| 2014/0287344 A1* | 9/2014 | Suzue | H01M 8/1004 429/483 |
| 2015/0295250 A1* | 10/2015 | Nagami | H01M 4/926 429/524 |
| 2016/0064744 A1 | 3/2016 | Mashio et al. | |
| 2016/0093892 A1 | 3/2016 | Hori et al. | |
| 2017/0092929 A1* | 3/2017 | Momma | H01M 4/04 |
| 2017/0141405 A1 | 5/2017 | Neumann et al. | |
| 2017/0207463 A1 | 7/2017 | Arai et al. | |
| 2018/0069247 A1 | 3/2018 | Iijima et al. | |
| 2018/0301726 A1* | 10/2018 | Shintani | H01M 4/8605 |
| 2020/0028183 A1 | 1/2020 | Kim et al. | |

FOREIGN PATENT DOCUMENTS

| | | | |
|---|---|---|---|
| EP | 1 852 180 A1 | 11/2007 | |
| EP | 2 551 499 A1 | 1/2013 | |
| EP | 3 150 833 A1 | 4/2017 | |
| JP | 4180278 B2 | 11/2008 | |
| JP | 2017-126514 | 7/2017 | |
| JP | 2017-130446 | 7/2017 | |
| KR | 2013-0073960 A | 7/2013 | |
| KR | 10-2017-0020845 A | 2/2017 | |
| KR | 10-2018-0036107 A | 4/2018 | |
| WO | WO 01/86126 A2 | 11/2001 | |
| WO | WO 02/31903 * | 4/2002 | ............. H01M 8/10 |
| WO | WO 2012-046138 A1 | 4/2012 | |
| WO | WO2014/175106 A1 | 10/2014 | |
| WO | WO 2016/133132 | 8/2016 | |

OTHER PUBLICATIONS

Uchida (Makato Uchida et al., "Effect of the state of distribution of supported Pt nanoparticles on effective Pt utilization in polymer electrolyte fuel cells", Phys. Chem. Chem. Phys., 15 (2013), pp. 11236-11247) (Year: 2013).*

* cited by examiner

CATALYST LAYER FOR FUEL CELL AND PRODUCTION METHOD THEREFOR

TECHNICAL FIELD

The present invention relates to a catalyst layer for fuel cells and a production method therefor.

BACKGROUND ART

Fuel cells convert chemical energy directly to electric energy by supplying a fuel gas (hydrogen gas) and an oxidant gas (oxygen gas) to two electrically connected electrodes and electrochemically oxidizing the fuel. Such fuel cells are generally constructed by laminating a plurality of unit cells having a membrane electrode assembly having a basic structure in which an electrolyte membrane is interposed between a pair of electrodes. Among such fuel cells, since solid polymer electrolyte-type fuel cells using a solid polymer electrolyte membrane as the electrolyte membrane have advantages such as easy miniaturization and operation at low temperatures, solid polymer electrolyte-type fuel cells have attracted attention particularly as portable and mobile power sources.

In solid polymer electrolyte-type fuel cells, the reaction of the following Formula (1) proceeds at the anode (fuel electrode) supplied with hydrogen.

$$H_2 \rightarrow 2H^+ + 2e^- \qquad (1)$$

The electrons (e⁻) generated by the above Formula (1) reach the cathode (oxidant electrode) after working with an external load via an external circuit. Conversely, the protons (H⁺) generated in the above Formula (1) move from the anode side to the cathode side in the solid polymer electrolyte membrane by electroosmosis in a state hydrated with water.

The reaction of the following Formula (2) proceeds at the cathode.

$$2H^+ + \tfrac{1}{2}O_2 + 2e^- \rightarrow H_2O \qquad (2)$$

Thus, in the entire battery, the chemical reaction shown in the following Formula (3) proceeds and an electromotive force is generated to perform electrical work on the external load.

$$H_2 + \tfrac{1}{2}O_2 \rightarrow H_2O \qquad (3)$$

Both the anode and the cathode generally have a structure in which a catalyst layer and a gas diffusion layer are laminated in this order from the electrolyte membrane side. Conventionally, a catalyst-loaded carrier in which a catalytic metal such as platinum or a platinum alloy for promoting the above electrode reaction is supported on a carrier having fine pores such as carbon, and an ionomer for promoting proton conductivity are included in the catalyst layer.

In the field of fuel cells having such a configuration, attempts have been made to improve the performance of fuel cells by paying attention to the catalyst layer. For example, the Examples of Japanese Unexamined Patent Publication (Kokai) No. 2017-130446 disclose that an oxygen activation treatment is performed after a carbon carrier is graphitized at 1800° C. in order to increase the durability of the catalyst carrier in the catalyst layer. In addition, WO 2016/133132 discloses a heat treatment at 1600 to 2500° C. under an inert gas atmosphere after activating a carbon carrier.

SUMMARY OF THE INVENTION

Problem to be Solved by the Disclosure

However, in the carbon carrier described in the Examples of Japanese Unexamined Patent Publication (Kokai) No. 2017-130446, since the graphite treatment temperature is as low as 1800° C., the carbon carrier has a low degree of crystallinity, and an activation treatment causes flooding at high humidification of the fuel cell, especially at high humidification and high load, which may lower the power generation performance. This is probably because when the temperature of the graphitization treatment is low, the interiors of the pores of the carbon carrier can easily become hydrophilic during the activation treatment, and as a result, excess ionomer enters the interiors of the pores of the carbon carrier, whereby the ionomer coverage becomes too high. Furthermore, in the carbon carrier described in WO 2016/133132, since the graphitization treatment is carried out after the oxygen activation, activation is carried out in a state in which the degree of crystallization is low, and as a result, there is a risk that the pore structure of the carbon support may be destroyed.

The present invention has been conceived of in view of the above circumstances and aims to provide a catalyst layer for fuel cells in which the coverage of ionomer with respect to the catalyst metal carried on the carbon carrier is controlled so that a reduction in performance can be prevented at high humidification, in particularly under high humidification and high load, while maintaining performance at low humidification.

Features for Solving the Problem

The present invention can achieve the above object by the following means.

<1> A catalyst layer for a fuel cell, comprising a carbon carrier having pores, a catalyst metal carried on the carbon carrier, and an ionomer covering the carbon carrier, wherein the crystal length of the carbon carrier is not less than 6 nm, and the coverage of the catalyst metal by the ionomer is 55% to 65%.

<2> The catalyst layer according to <1>, wherein the carbon carrier is a communication hole-type carbon carrier in which the pores are in communication.

<3> The catalyst layer according to <1> or <2>, wherein the average pore diameter of the carbon carrier is 1 to 20 nm.

<4> The catalyst layer according to any one of <1> to <3>, wherein the primary particle diameter of the carbon carrier is 200 to 700 nm.

<5> A method for the production of a catalyst layer for a fuel cell, comprising:
heat-treating a carbon carrier having pores under an inert gas atmosphere so that the crystal length of the carbon carrier becomes not less than 6 nm,
heat-treating the heat-treated carbon carrier under an oxygen atmosphere to activate the carbon carrier,
allowing the activated carbon carrier to carry a catalyst metal,
mixing the carbon carrier carrying the catalyst metal and an ionomer to cover the carbon carrier with the ionomer, and
forming the catalyst layer for a fuel cell using the carbon carrier covered with the ionomer.

<6> The method according to <5>, wherein the temperature of the heat treatment under the inert gas atmosphere is 2000° C. to 2300° C.

<7> The method according to <5> or <6>, wherein the carbon carrier is a communication hole-type carbon carrier in which the pores are in communication.

<8> The method according to any one of <5> to <7>, wherein the average pore diameter of the carbon carrier is 1 to 20 nm.

<9> The method according to any one of <5> to <8>, wherein the primary particle diameter of the carbon carrier is 200 to 700 nm.

Effects of the Invention

According to the fuel cell for catalyst layers of the present invention, by setting the crystal length of the carbon carrier to an appropriate length, it is possible to control the degree of hydrophilicity of the pores of the carbon carrier, thereby controlling the coverage of the catalyst metal by the ionomer, whereby it is possible to suppress a reduction in performance at the time of high humidification, particularly at high humidification and high load, while maintaining performance at low humidification.

MODE FOR CARRYING OUT THE INVENTION

Figure 1:
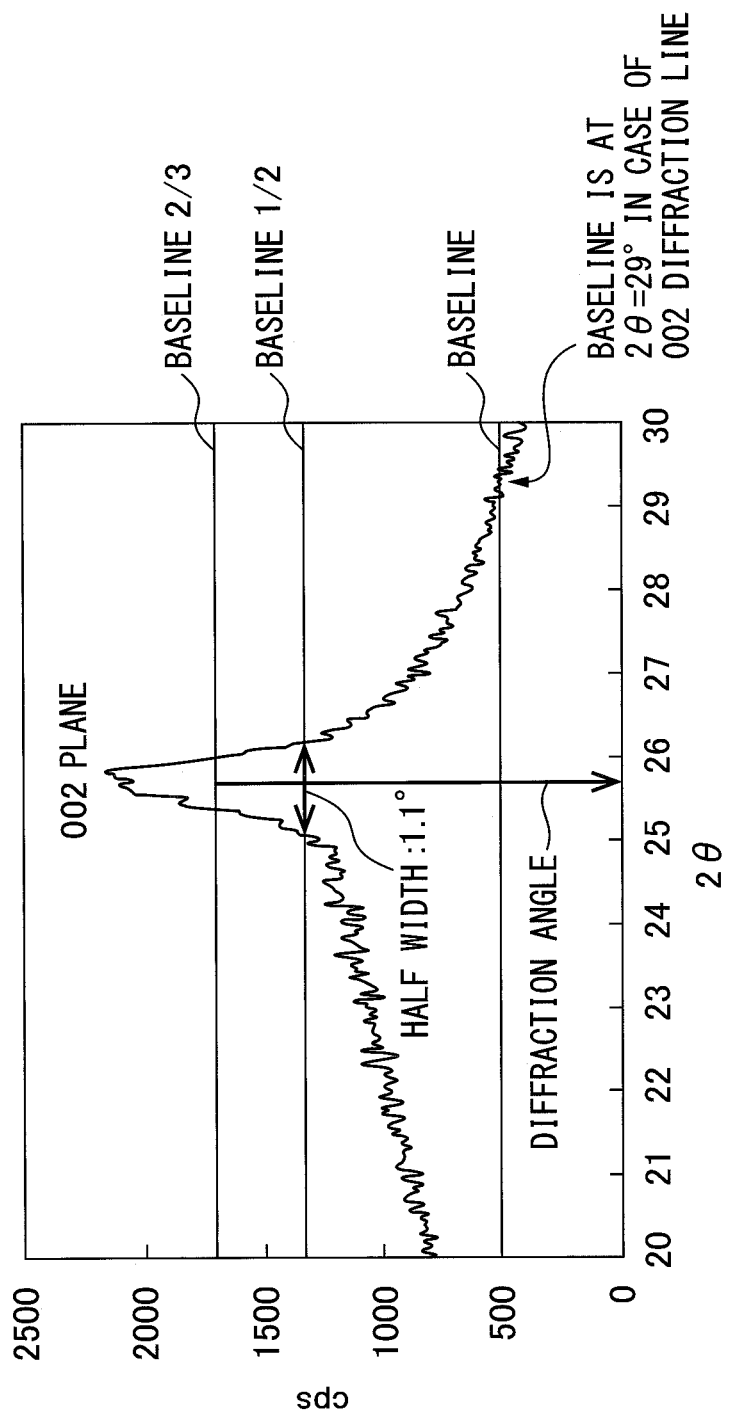
FIG. 1 is a graph showing an X-ray diffraction line used for the measurement of crystal length.

The embodiments of the present invention will be described in detail below. Note that the present invention is not limited to the following embodiments, and various modifications can be made within the scope of the gist of the present invention.

<Catalyst Layer for Fuel Cells>

The catalyst layer for fuel cells of the present invention comprises a carbon carrier having pores, a catalyst metal carried on the carbon carrier, and an ionomer covering the carbon carrier, wherein the crystal length of the carbon carrier is 6 nm or more, and the coverage of the catalyst metal by the ionomer is 55% to 65%.

Since the catalyst-loaded carrier, in which a catalyst metal such as Pt or Pt alloy particles is carried in a carbon carrier having fine pores, can carry a catalyst metal in the pores of the carbon carrier, the catalyst metal does not enter between the primary particles of the carbon carrier, and since gas easily diffuses into the interior of the carrier particle agglomerates, the utilization factor of catalyst metal is high. Thus, a fuel cell equipped with a catalyst layer containing such a catalyst-loaded carrier exhibits excellent power generation performance.

In addition to the carbon carrier carrying such a catalyst metal, a proton conductive compound referred to as an ionomer is generally included in such a catalyst layer. This ionomer serves as an adhesive between the electrolyte membrane and the catalyst layer and a conductor of protons generated in the catalyst layer.

This ionomer enters into the pores of the carbon carrier carrying the catalyst metal in the catalyst layer. When the amount of ionomer in the pores is excessive, flooding is promoted inside the pores at the time of high humidification and hyperhumidification, and there is a problem that the high humidification performance and hyperhumidification performance of the fuel cell is reduced.

Conversely, when the amount of ionomer in the pores is insufficient, the diffusion of protons into the interior of the carrier is hindered at the time of low humidification and there is a problem that the low humidification performance of the fuel cell is reduced.

The present inventors have discovered that when the degree of hydrophilization of the carbon carrier is set to within an appropriate range by setting the crystal length of the carbon carrier to a predetermined length prior to dispersion of the ionomer, the surface of the carbon carrier can be covered with the ionomer at an appropriate ratio, whereby appropriate ionomer coverage of the catalyst metal by the ionomer can be achieved, and as a result, the power generation performance of the fuel cell can be improved.

(Carbon Carrier)

As long as the carbon carrier includes pores, the carbon carrier may be, for example, a carbon particle such as Ketjen Black (trade name; Ketjen Black International, Ltd.), Vulcan (trade name; Cabot Corp.), Norit (trade name; Norit Corp.), Black Pearl (trade name; Cabot Corp.), or Acetylene Black (trade name; Chevron Corp.), a carbon fiber such as carbon nanotubes, carbon nanohorns, carbon nanowalls, or carbon nanofibers, or a conductive carbon material such as a carbon alloy.

The carbon carrier is preferably a communication hole-type carbon carrier in which the pores are in communication. Furthermore, the average pore diameter of the carbon carrier is not particularly limited and may be 1 nm or more, or 2 nm or more, and 20 nm or less, or 10 nm or less. The primary particle diameter of the carbon carrier is not particularly limited and may be 200 nm or more, 300 nm or more, or 400 nm or more, and may be 700 nm or less or 600 nm or less.

The average pore diameter and primary particle diameter are values measured by conventional methods in the pertinent technical field. For example, the average pore diameter can be measured by a mercury penetration method using a mercury porosimeter. Furthermore, primary particle diameter can be determined by calculating the diameter (equivalent circular diameter) of a certain single particle in a transmission electron microscope (TEM) image or scanning electron microscope (SEM) image of an appropriate magnification (for example, 50,000 to 1,000,000 times) when the particle is taken as a circle, performing calculation of the particle diameter by TEM observation or SEM observation as described above for 200 to 300 particles of the same type, and setting the average particle size as the number average of these particles.

In the present invention, the crystal length of the carbon carrier may be 6 nm or more, 8 nm or more, 10 nm or more, 12 nm or more, 14 nm or more, 16 nm or more, or 18 nm or more. Furthermore, the crystal length of the carbon carrier may be 20 nm or less. By adjusting the crystal length of the carbon carrier in this manner, the proportion of hydrophilic pores among the pores of the carbon carrier can be adjusted, and as a result, the coverage of the catalyst metal by the ionomer, i.e., the ionomer coverage, can be adjusted.

In the present invention, the proportion of hydrophilic pores among the pores of the carbon carrier may be 60 to 65%.

Furthermore, in the present invention, the ionomer coverage may be 55% or more, 56% or more, 57% or more, or 58% or more, and may be 65% or less, 64% or less, 63% or less, 62% or less, or 61% or less.

The methods for measuring crystal length, the proportion of hydrophilic pores, and the ionomer coverage will be described later.

(Catalyst Metal)

The catalyst metal may comprise at least one selected from the group consisting of platinum and a platinum alloy. Examples of platinum alloys include alloys of a metal material selected from the group consisting of tin, molybdenum, cobalt, iridium, ruthenium, rhodium, nickel, and gold, with platinum. One or two or more metals may be used as the metal other than platinum constituting the platinum alloy. In order to obtain good catalytic activity and durability, the content ratio of platinum may be 90% by weight or more when the total weight of the alloy is 100% by weight.

The average particle diameter of the catalyst metal is not particularly limited and may be 3 nm or more, or 3.5 nm or more, and may be 10 nm or less, or 5 nm or less. This particle diameter can be measured in the same manner as the particle diameter of the carbon carrier.

The carrying amount of the catalyst metal may be selected such that the catalyst metal is 1 to 99% by weight, 10 to 90% by weight, or 30 to 70% by weight relative to the carbon carrier.

(Ionomer)

The ionomer may have proton conductivity, and may be, for example, a perfluorosulfonic acid-type resin such as Nafion™. The content of the ionomer in the catalyst layer may be appropriately selected relative to the amount of the carbon carrier. The weight ratio of the carbon carrier and the ionomer (carbon carrier:ionomer) may be 1.0:0.5 to 1.0:1.2, 1.0:0.6 to 1.0:1.0, 1.0:0.7 to 1.0:0.9, or 1.0:0.75.

(Crystal Length Measurement Method)

In the present invention, the crystal length of the carbon carrier is 6 nm or more. This crystal length means a value calculated by the Scherrer method using X-ray diffraction, and includes the following procedures.

1. First, the carbon carrier is measured by X-ray diffraction.
2. The measured diffraction line is corrected for the Lorentz factor, polarization factor, and scattering factor using standard silicon.
3. The corrected diffraction line is smoothed by the Savitsky-Golay method.
4. A baseline at $2\theta=29°$ is subtracted from the peak of the 002 plane in the diffraction line (FIG. 1).
5. The intermediate value of the peak width at ⅔ height from the baseline is set to the diffraction angle ($2\theta$), and the width of the peak at ½ height is set as the full width at half maximum (FWHM).
6. The crystal length (Lc) is calculated from the following Scherrer Formula:

$$Lc = K \times \lambda / \beta \times \cos\theta$$

(where K is the shape factor (0.9), Scherrer constant, $\beta$ is the FWHM (radians), the spreading of the diffraction line due to crystallite size, $\lambda$ is the wavelength of the X-ray tube used (CuK$\alpha$: 1.5418 angstrom), and $\theta$ is the diffraction angle (radians))

Specifically, the diffraction angle $2\theta$ corresponding to the 002 plane of carbon is 25.8°. When converted to radians, this is $(25.8/2) \times (\pi/180) = 0.2250$ radians.

The FWHM $\beta$ of the peak of the 002 plane in the diffraction line is 0.6°, and the crystal length (Lc) can be calculated in the following manner:

$$Lc = 0.9 \times 1.5418 / \{(0.6-0.16) \times (\pi/180) \times \cos(0.2250)\} = 115 \text{ angstrom} = 11.5 \text{ nm}$$

(Hydrophilic Pore Proportion Measurement Method)

The proportion of hydrophilic pores in the pores of the carbon carrier is calculated by the following method.

The proportion of hydrophilic pores is calculated by the following Formula (4) in accordance with the method of contact porosimetry.

hydrophilic pore proportion(%) = volume of hydrophilic pores/total pore volume × 100   (4)

In general, the pore volume of a porous body is measured using the contact porosimetry method (Yu. M. Volfkovich, et al., Colloids and Surfaces A187-188 (2001), pp. 349-365) using mercury. In this method, pressure is applied to introduce mercury into the pores the substance, and the specific surface area and pore distribution are obtained from the pressure and the amount of mercury introduced.

In the present invention, the volume of hydrophilic pores (water) and the total pore volume (octane) are measured using water and octane instead of mercury, and the proportion of hydrophilic pores can be calculated based on the values of these volumes according to the above Formula (4).

(Ionomer Coverage Measurement Method)

In the present invention, the coverage of the catalyst metal by the ionomer is 55 to 65%. This ionomer coverage is calculated by the following method.

Figure 2:
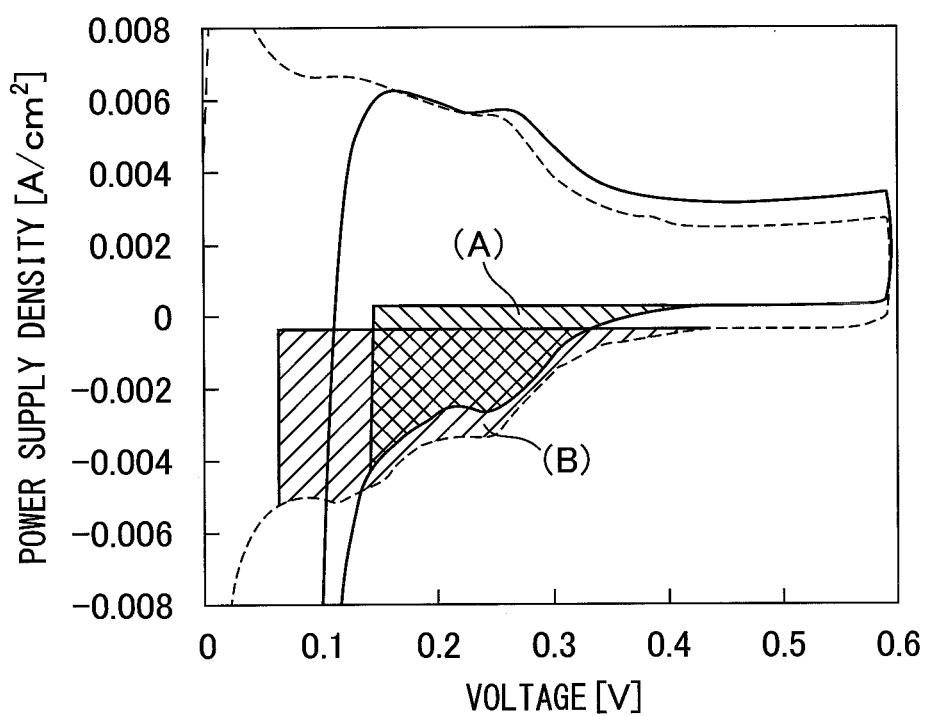
FIG. 2 is a view showing a cyclic voltammogram used for the measurement of ionomer coverage.

A fuel cell having a structure in which an electrolyte membrane is interposed between a pair of catalyst layers is constructed, hydrogen is supplied to one catalyst layer of this fuel cell, and cyclic voltammetry of this fuel cell is carried out with the other to-be-evaluated catalyst layer being immersed in a fluorine solvent (Fluorinert (FC-3283) manufactured by 3M Corporation). FIG. 2 is a graph showing the executed cyclic voltammetry, and the electro-chemical surface area (ECSA) as shown in the shaded area (A) of FIG. 2 is measured. Furthermore, water is used in place of the fluorine solvent, and the electro-chemical surface area (ECSA) as similarly shown in the shaded area (B) of FIG. 2 is measured.

Figure 3A:
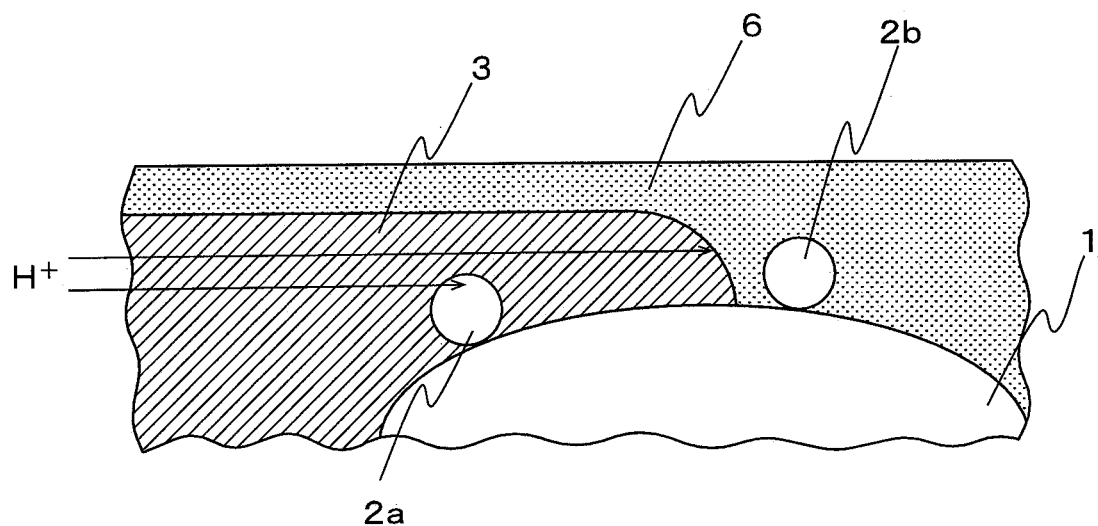
FIG. 3A is a view for explaining the concept of ionomer coverage.
Figure 3B:
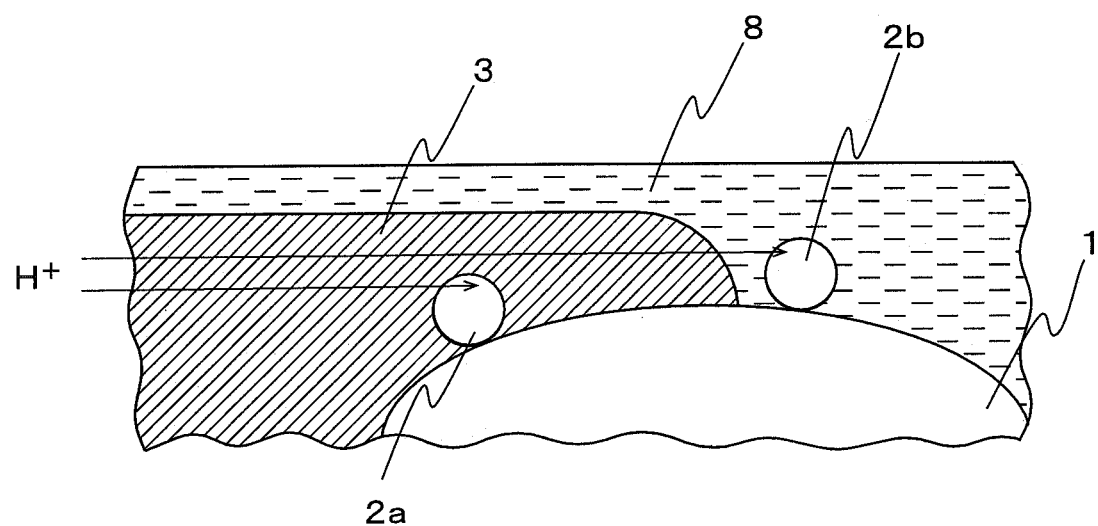
FIG. 3B is a view for explaining the concept of ionomer coverage.

When the fluorine solvent 6 is used, among the catalyst metal particles 2a, 2b on the carbon carrier 1, protons (H) reach only the catalyst metal particles 2a covered with the ionomer 3, whereby only the catalyst metal particles 2a can contribute to the battery reaction, as shown in FIG. 3A. Conversely, when water 8 is used, among the catalyst metal particles 2a, 2b on the carbon carrier 1, protons (H$^+$) reach not only the catalyst metal particles 2a covered with the ionomer 3 but also 2b through the water 8, as shown in FIG. 3B.

Thus, the ionomer coverage of the catalyst layer for fuel cells can be calculated as the ratio of these ECSA values, as shown in the following Formula.

ionomer coverage = (ECSA measured using fluorine solvent)/(ECSA measured using water)

<Method for Production of Catalyst Layer for Fuel Cells>

The method for the production of a catalyst layer for fuel cells of the present invention comprises:

heat-treating a carbon carrier having pores under an inert gas atmosphere so that the crystal length of the carbon carrier becomes 6 nm or more, heat-treating the heat-treated carbon carrier under an oxygen atmosphere to activate the carbon carrier, allowing the activated carbon carrier to carry a catalyst metal, mixing the carbon carrier carrying the catalyst metal and an ionomer to cover the carbon carrier with the ionomer, and forming the catalyst layer for a fuel cell using the carbon carrier covered with the ionomer.

(Heat Treatment Step)

In the method of the present invention, first, the carbon carrier as a starting material is heat-treated under an inert gas atmosphere. The carbon carrier is graphitized by this heat treatment, and the crystallite of the carbon material constituting the carbon carrier grows significantly. This heat treatment is performed so that the crystal length of the carbon carrier becomes 6 nm or more. The heating temperature of this heat treatment may be 2000° C. or more, 2042° C. or more, 2050° C. or more, 2100° C. or more, 2150° C. or more, 2200° C. or more, or 2250° C. or more, and may be 2400° C. or less, 2350° C. or less, or 2300° C. or less. Examples of the inert gas include nitrogen and argon.

(Activation Step)

Next, the heat-treated carbon carrier is activated under an oxygen atmosphere. This activation step is performed by heating in an oxygen atmosphere. "Under an oxygen atmosphere" means an atmosphere containing an oxygen-containing gas, for example, air, dry air, or pure oxygen. The heating temperature may be 1900° C. or more, 1950° C. or more, or 2100° C. or more, and may be 2300° C. or less, 2200° C. or less, or 2150° C. or less.

(Catalyst Metal Carrying Step)

Thereafter, the activated carbon carrier is allowed to carry a catalyst metal. Any conventionally used method can be adopted as the method for allowing the carbon carrier to carry the catalyst metal. For example, a method comprising mixing a catalyst metal with a carrier dispersion liquid in which the carbon carrier is dispersed, followed by filtering, washing, re-dissolving in ethanol or the like, and subsequently drying with a vacuum pump or the like can be used.

(Ionomer Coating Step)

Subsequently, the carbon carrier carrying the catalyst metal and the ionomer are mixed to coat the carbon carrier with the ionomer. By this coating step, the ionomer can penetrate the interiors of the pores of the carbon carrier and the ionomer can coat the surface of the catalyst metal carried on the surface of the carbon carrier (pore inner wall surfaces of the carbon carrier).

In this coating step, in order to coat the carbon carrier with the ionomer, a dispersion medium may be added. The dispersion medium is not particularly limited, and may be appropriately selected depending on the ionomer to be used. For example, an alcohol such as methanol, ethanol, propanol, or polyethylene glycol, N—N-dimethyl formamide, N,N-diethyl formamide, N,N-dimethyl acetamide, N,N-diethyl acetamide, or a mixture thereof with or without water may be used.

The coating method is not particularly limited. The coating method may be carried out with a harmonizer, a ball mill, a shear mixer, or a roll mill. From the viewpoint of improving coverage, a ball mill may be used. The ball mill is not particularly limited and a planetary ball mill may be used. The material of the balls is not particularly limited and zirconia or alumina balls can be used. The diameters of the balls are not particularly limited and may be 0.5 to 2 mm. The rotation speed of the tabletop of the ball mill is not particularly limited and may be 300 to 500 rpm. In the present disclosure, "ball mill" means a conventionally known device for rotating balls and a material in a container, and is a concept encompassing bead mills.

After the covering step, the catalyst layer is formed. The method for forming the catalyst layer is not particularly limited. For example, after the covering step, if necessary, a dispersion medium is added and applied to the surface of a substrate such as carbon paper or a solid electrolyte membrane, followed by drying to form a membrane. The thickness of the catalyst layer for fuel cells is not particularly limited and may be 20 μm or less, or 10 μm or less, and may be 3 μm or more.

The details of the carbon carrier and catalyst in the method for producing a catalyst layer for fuel cells described above are the same as those of the catalyst layer for fuel cells described above, and thus, a description thereof has been omitted.

EXAMPLES

<Carbon Carrier Heat Treatment>

Mesoporous carbon having pore diameters in the range of 2 nm to 10 nm was prepared as carbon carriers. These carbon carriers were subjected to heat treatment in an argon gas stream for 1 hour while maintaining the temperatures shown in Table 1 below to carry out graphitization. Thereafter, the crystal lengths thereof were measured by the method described above. The results are shown in Table 1 below.

TABLE 1

| Graphitization Temperature (° C.) | Crystal Length (nm) |
| --- | --- |
| 937.5 | 0.60 |
| 1640 | 1.00 |
| 1860 | 1.19 |
| 1980 | 5.60 |
| 2042 | 17.07 |
| 2100 | 18.00 |
| 2300 | 18.60 |

As shown in Table 1 above, crystallinity was low when the graphitization temperature was 2000° C. or less. When the graphitization temperature was 2000° C. or greater, sufficient crystal length was achieved. However, at temperatures exceeding 2300° C., structural failure may occur. Note that, though the values of Table 1 are values prior to the activation of the carbon carrier, there were no changes after activation.

Example 1

(Heat Treatment Step and Activation Step)

Mesoporous carbon having pore diameters of 2 nm to 10 nm was prepared as the carbon carrier. This carbon carrier was subjected to heat treatment in an argon gas stream for 1 hour while maintaining the temperature at 2042° C. to carry out graphitization. Next, the carbon carrier was maintained at 500° C. in an air flow for 1 hour to carry out activation.

(Catalyst Metal Carrying Step)

Next, the activated carbon carrier and a catalyst were chemically reduced by immersion in a Pt complex solution (pH 1) such that Pt particles serving as the catalyst were carried on the carbon carrier, whereby a catalyst metal-carrying carrier was obtained.

(Ionomer Covering Step)

Thereafter, a perfluorosulfonic acid-type resin having high oxygen permeability as the ionomer, a planetary ball mill (P7 manufactured by Fritsch), and zirconia beads (diameter 1 mm) were prepared. The zirconia beads, the above catalyst metal-carrying carrier, and the ionomer were charged into the container of the planetary ball mill, and the container was completely sealed. At the time of charging, the input amounts of catalyst metal-carrying carrier and ionomer were adjusted so that the ratio (I/C) of ionomer (I) and carbon carrier (C) was 0.75 (weight ratio). The container was attached to the main body of the planetary ball mill, processing was carried out at a table rotation speed of 300 rpm for 6 hours, and the catalyst metal-carrying carrier was coated with the ionomer to obtain a catalyst for fuel cells. The obtained catalyst for fuel cells, ethanol, and water were stirred and mixed to prepare a catalyst ink.

(Fuel Cell Production)

The above catalyst ink was applied by spray coating to both surfaces of a perfluorocarbon sulfonic acid resin membrane (thickness 10 μm) so that the amount of platinum per unit area was 0.2 mg-Pt/cm$^2$. This catalyst ink was dried to form a catalyst layer, whereby an electrolyte membrane catalyst layer assembly was obtained. The thickness of the catalyst layer was 6 μm.

The obtained electrolyte membrane catalyst layer assembly was interposed between carbon paper for the gas diffusion layer and thermocompression-bonded to obtain a membrane electrode assembly (MEA). Further, this membrane electrode assembly was interposed between two separators (made of carbon) to produce a fuel cell.

Example 2

A catalyst ink was produced in the same manner as Example 1 except that in the heat treatment step, the carbon carrier was subjected to heat treatment at 2100° C. to carry out graphitization. Thereafter, a fuel cell was produced.

Example 3

A catalyst ink was produced in the same manner as Example 1 except that in the heat treatment step, the carbon carrier was subjected to heat treatment at 2300° C. to carry out graphitization. Thereafter, a fuel cell was produced.

Comparative Example 1

A catalyst ink was produced in the same manner as Example 1 except that in the heat treatment step, the carbon carrier was subjected to heat treatment at 1980° C. to carry out graphitization. Thereafter, a fuel cell was produced.

Comparative Example 2

A catalyst ink was produced in the same manner as Example 1 except that in the heat treatment step, the carbon carrier was subjected to heat treatment at 1980° C. and activation was subsequently carried out in 1 mol/L of nitric acid at 80° C. for 48 hours. Thereafter, a fuel cell was produced.

Comparative Example 3

A catalyst ink was produced in the same manner as Example 1 except that in the heat treatment step, the carbon carrier was subjected to heat treatment at 1980° C. and activation was not subsequently carried out. Thereafter, a fuel cell was produced.

The treatment conditions, proportion of hydrophilic pores, and ionomer coverage of the carbon carriers in the catalyst layers produced in Examples 1 to 3 and Comparative Examples 1 to 3 above are shown in Table 2 below.

TABLE 2

| | Graphitization Temperature (Crystal Length) | Activation Conditions | Proportion of Hydrophilic Pores | Ionomer Coverage |
|---|---|---|---|---|
| Example 1 | 2042° C. (17.07 nm) | 500° C. 1 hour, in Air | 66% | 60% |
| Example 2 | 2000° C. (18.00 nm) | 500° C. 1 hour, in Air | 60% | 61% |
| Example 3 | 2300° C. (18.60 nm) | 500° C. 1 hour, in Air | 59% | 58% |
| Comp. Example 1 | 1980° C. (5.60 nm) | 500° C. 1 hour, in Air | 75% | 84% |
| Comp. Example 2 | 1980° C. (5.60 nm) | 80° C. 48 hours, 1 mol/L nitric acid | 97% | 100% |
| Comp. Example 3 | 1980° C. (5.60 nm) | N/A | 70% | 71% |

As shown in Table 2, in Examples 1 to 3, in which graphitization temperatures such that the crystal length becomes 6 nm or more were used, the proportion of hydrophilic pores was suitably controlled, whereby the ionomer coverage could be controlled within the range of 58 to 61%. Conversely, in Comparative Examples 1 to 3, the ionomer coverage was in the range of 71 to 100%.

The following tests and evaluations were performed for the produced fuel cells.

<Power Generation Performance Test Under High Humidification (90% RH) Conditions>

Power generation was performed under the conditions described below using the fuel cells obtained in Examples 1 to 3 and Comparative Examples 1 to 3 to obtain current density-voltage curves.

Anode gas: hydrogen gas having a relative humidity (RH) of 90% (dew point of 77° C.)

Cathode gas: air having a relative humidity (RH) of 90% (dew point of 77° C.)

Cell temperature (cooling water temperature): 80° C.

From the current density-voltage curves obtained in accordance with the power generation performance tests under high humidification (90% RH) conditions described above, the voltages of the fuel cells of Examples 1 to 3 and Comparative Examples 1 to 3 under high load (3.5 A/cm$^2$) and low load (0.2 A/cm$^2$) conditions at high humidification (90% RH) were evaluated. The results are shown in Table 3.

Furthermore, regarding the fuel cell of Comparative Example 1 under high humidification (90% RH) and high load (3.5 A/cm$^2$) conditions, Table 3 shows the difference between the power generation performance (V) of the fuel cell of Comparative Example 1 and the power generation performances (V) of the fuel cells of Examples 1 to 3 and Comparative Examples 2 and 3.

<Power Generation Performance Test Under Hyperhumidification (250% RH) Conditions>

Power generation was performed under the conditions described below using the fuel cells obtained in Examples 1 to 3 and Comparative Examples 1 to 3 to obtain current density-voltage curves.

Anode gas: hydrogen gas having a relative humidity (RH) of 250% (dew point of 70° C.)

Cathode gas: air having a relative humidity (RH) of 250% (dew point of 70° C.)

Cell temperature (cooling water temperature): 50° C.

From the current density-voltage curves obtained in accordance with the power generation performance tests under hyperhumidification (250% RH) conditions described above, the voltages of the fuel cells of Examples 1 to 3 and Comparative Examples 1 to 3 under hyperhumidification (250% RH) and high load (3.5 A/cm$^2$) conditions were evaluated. The results are shown in Table 3.

<Power Generation Performance Test Under Low Humidification (40% RH) Conditions>

Power generation was performed under the conditions described below using the fuel cells obtained in Examples 1 to 3 and Comparative Examples 1 to 3 to obtain current density-voltage curves.

Anode gas: hydrogen gas having a relative humidity (RH) of 40% (dew point of 59° C.)

Cathode gas: air having a relative humidity (RH) of 40% (dew point of 59° C.)

Cell temperature (cooling water temperature): 80° C.

From the current density-voltage curves obtained in accordance with the power generation performance tests under low humidification (40% RH) conditions described above, the voltages of the fuel cells of Examples 1 to 3 and Comparative Examples 1 to 3 under low humidification (40% RH) and low load (0.2 A/cm$^2$) conditions were evaluated. The results are shown in Table 3.

Further, the ratio of the voltage (V) under low humidification (40% RH) and low load (0.2 A/cm$^2$) conditions to the voltage under high humidification (90% RH) and low load (0.2 A/cm$^2$) conditions was calculated as the performance reduction rate (low humidification and low load/high humidification and low load×100(%)). The results are shown in Table 3.

TABLE 3

| | Ionomer Coverage | High Load (3.5 A/cm²) Performance (V) | | | Low Load (0.2 A/cm²) Performance (V) | | Performance Reduction Rate 40% RH/ 90% RH |
|---|---|---|---|---|---|---|---|
| | | 90% RH | Performance Difference | 250% RH | 90% RH | 40% RH | |
| Example 1 | 60% | 0.623 | 0.020 | 0.418 | 0.892 | 0.879 | 98.52% |
| Example 2 | 61% | 0.639 | 0.036 | 0.417 | 0.880 | 0.880 | 99.76% |
| Example 3 | 58% | 0.640 | 0.037 | 0.372 | 0.889 | .0881 | 99.12% |
| Comp. Example 1 | 84% | 0.603 | 0.000 (Baseline) | Not Evaluated | 0.878 | 0.866 | 98.60% |
| Comp. Example 2 | 100% | 0.574 | −0.029 | Not Evaluated | 0.878 | 0.863 | 98.27% |
| Comp. Example 3 | 71% | 0.596 | −0.007 | Not Evaluated | 0.877 | 0.869 | 99.12% |

As shown in Table 3, under low load (0.2 A/cm²) conditions, when the catalyst layers of the Examples including carbon carriers having an ionomer coverage of 58 to 61% are compared with the catalyst layers of the Comparative Examples having carbon carriers having an ionomer coverage of 71% or more under either high humidification or low humidification conditions, it can be seen that the power generation performance of the fuel cell can be improved. Furthermore, in the catalyst layers of the Examples, it was possible to maximize the performance of the fuel cell under extremely high load (3.5 A/cm²) conditions without reducing low load performance, and in particular, the effects under hyperhumidification conditions, which are linked to the actual cell, were significant.

What is claimed is:

1. A catalyst layer for a fuel cell, comprising a carbon carrier having pores graphitized at a temperature from 2000 degrees Celsius to 2300 degrees Celsius under inert gas to form crystals having a crystal length from 6 nm to 20 nm and about 60% to about 66% hydrophilic pores, a catalyst metal carried on the carbon carrier, and an ionomer covering the carbon carrier, wherein
a coverage of the catalyst metal by the ionomer is 55% to 66%.

2. The catalyst layer according to claim 1, wherein the carbon carrier comprises primary particles and said primary particles have a primary particle diameter of 200 to 700 nm.

3. The catalyst layer according to claim 1, wherein the average pore diameter of the carbon carrier is 1 to 20 nm.

4. The catalyst layer according to claim 1, wherein the coverage of the catalyst metal by the ionomer is 55% to 65%.

5. The catalyst layer according to claim 1, wherein the carbon carrier is a communication hole-type carbon carrier in which the pores are in communication.

6. The catalyst layer according to claim 5, wherein the carbon carrier comprises primary particles and said primary particles have a primary particle diameter of the carbon carrier is 200 to 700 nm.

* * * * *